UNITED STATES PATENT OFFICE.

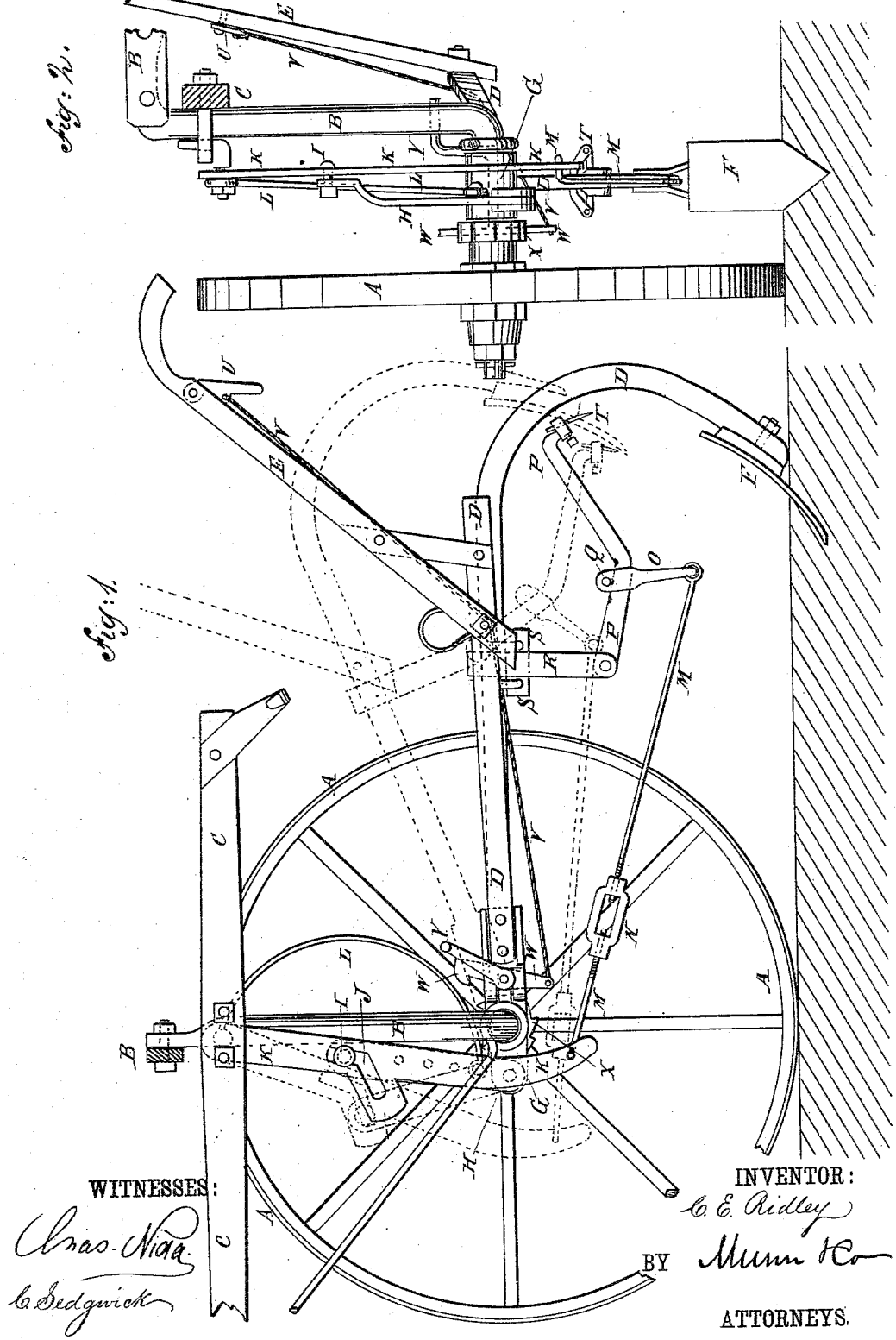

CHARLES E. RIDLEY, OF MAPLETON, IOWA.

PLOW-CLEANER FOR SULKY-CULTIVATORS.

SPECIFICATION forming part of Letters Patent No. 303,049, dated August 5, 1884.

Application filed March 4, 1884. (Model.)

*To all whom it may concern:*

Be it known that I, C. E. RIDLEY, of Mapleton, in the county of Monona and State of Iowa, have invented certain new and useful Improvements in Plow-Cleaners for Sulky-Cultivators, of which the following is a full, clear, and exact description.

Reference is to be had to the accompanying drawings, forming a part of this specification, in which similar letters of reference indicate corresponding parts in both the figures.

Figure 1 is a sectional side elevation of a sulky-cultivator to which my improvement has been applied. Fig. 2 is a front elevation of the same.

The object of this invention is to promote convenience and avoid loss of time in removing adhering soil from the plows of sulky-cultivators.

The invention consists in a plow-cleaner for sulky-cultivators, constructed with a scraper connected with the plow-beam, the arched axle, and the coupling-sleeve of the cultivator by bars so arranged that the partial revolution of the said sleeve will move the said scraper downward and the plow-beam and plow-plate upward. To the coupling-sleeve is pivoted a hook-lever to engage with a ratchet-wheel attached to the drive-wheel hub, the said hook-lever being provided with a cord extending back to a lever pivoted to the handle, and with a crank to strike against the axle and trip the said hook-lever, as will be hereinafter fully described.

A represents a wheel; B, the adjustable arched axle; C, the tongue; D, the plow-beams, one of which is broken away; E, a handle, and F the plow-plate or shovel of an ordinary cultivator. The forward end of the beams D is hinged to a lug formed upon the rear side of a sleeve, G, to give the rear parts of the plow-beams a free lateral movement.

To lugs formed upon the forward side of the sleeve G is rigidly attached the lower end of an upwardly-projecting bar, H, to the upper end of which is attached a pin, I, passing through an angular slot, J, in a swinging bar, K. The upper end of the bar K is pivoted to the vertical part of the axle B, near the upper end of the said part. To the pivot of the bar K is attached the upper end of a curved spring, L, the lower end of which is secured by a bolt or other suitable means to the bar H. Several holes are formed in the bar H to receive the fastening-bolt of the spring L, so that the tension of the said spring can be readily regulated as may be required. The spring L is designed to assist the weight of the plow-beam in bringing the said plow-beams D and the bars H K back to their places when released from the mechanism that operated them, and which is hereinafter described.

To the lower end of the bar K is pivoted the forward end of the rod M, which is made in two parts, connected at their adjacent ends by a long right-and-left nut, N, or by a long swiveled nut, so that the said rod M can be readily regulated in length, as may be required. The rear end of the rod M is pivoted to the lower end of an arm, O, the upper end of which is slotted to receive the bar P, to which the said end is secured by a bolt, Q. The bar P is bent at the part where the end of the arm O is secured to it, and in the upper concaved edge of the said bar are formed a number of recesses to receive the clamping-bolt Q, so that the position of the arm O can be adjusted as may be required. The forward end of the bar P is hinged to the lower end of a bar, R, the upper end of which is secured to the beam D by clips S or other suitable means, so that the said bar can be readily adjusted. The rear end of the bar P is bent downward, and to it is clamped, bolted, or otherwise secured the shank of a hoe or scraper, T. With this construction, as the lower end of the bar K is swung forward and back, the scraper T will be moved downward and upward along the face of the plow-plate F, removing any soil adhering to the said plow-plate.

To the upper part of the handle E is pivoted a lever, U, to which is attached the end of a cord or chain, V. The cord or chain V passes around the connecting-rod of the beams D, or around a guide-pulley pivoted to the said rod, or to a beam, D. The forward end of the cord or chain V is attached to the lower end of a lever, W, the pivot of which passes through the rear lug of the sleeve G. Upon the upper end of the lever W is formed a hook to engage with the teeth of a ratchet-wheel, X, attached to or formed upon the inner end of the hub of the wheel A. To the other end of the pivot of the hook-lever W is attached a crank, Y, which, when the sleeve G is turned by the action of the wheel F upon the lever W, raising the plow-beams and plows, and swinging the bar K forward to draw the scraper T downward and clean the plow-plate F, strikes against the vertical part of the axle B and raises the hook of the lever W away from the teeth of the ratchet-wheel X, allowing the plow-beams D and the bar K to return to their normal position.

The crank Y is so arranged with reference to the hook-lever W that the said hook-lever will remain in gear with the ratchet-wheel X only long enough to move the scraper T downward along the face of the plow F, and then the hook-lever is disengaged and the various parts of the mechanism return to their former positions.

Having thus described my invention, I claim as new and desire to secure by Letters Patent—

1. A plow-cleaner for sulky-cultivators constructed, substantially as herein shown and described, with a scraper connected with the plow-beam, arched axle, and sleeve-coupling of the cultivator by bars arranged so that the partial revolution of the said sleeve will operate the said scraper to remove soil from the plow-plate, as set forth.

2. The combination, with the beam D, the axle B, and the coupling-sleeve G, of the rigid arm H and spring L, swinging bar K, having slot J, the connecting-rod M, arm O, pivoted bar P, carrying scraper T and supporting bar R, substantially as herein shown and described, whereby the partial revolution of the said sleeve G is made to move the scraper downward along the face of the plow-plate, and the plow-beam and plow-plate upward, as set forth.

3. The combination, with the sleeve G, the plow-beam D, the handle E, and the hub of the drive-wheel A, of the ratchet-wheel X, the hook-lever W, the cord and lever V U, and the crank Y, substantially as herein shown and described, whereby the drive-wheel is made to partially rotate the said sleeve and then allow the sleeve to turn back, as set forth.

CHARLES E. RIDLEY.

Witnesses:
J. A. WAXEFIELD,
ALLEN COE.